US008267212B1

(12) United States Patent
Mercier et al.

(10) Patent No.: US 8,267,212 B1
(45) Date of Patent: Sep. 18, 2012

(54) SNOWMOBILE HAVING FRONT TRACKS WITH BRAKES

(75) Inventors: Daniel Mercier, Magog (CA); Guillaume Longpre, Valcourt (CA); Alain Massicotte, Orford (CA); Etienne Guay, Orford (CA)

(73) Assignee: Bombardier Recreational Products Inc., Valcourt (CA)

( * ) Notice: Subject to any disclaimer, the term of this patent is extended or adjusted under 35 U.S.C. 154(b) by 414 days.

(21) Appl. No.: 12/626,809

(22) Filed: Nov. 27, 2009

Related U.S. Application Data

(60) Provisional application No. 61/118,496, filed on Nov. 28, 2008.

(51) Int. Cl.
*B62D 55/00* (2006.01)
*B62M 29/00* (2006.01)
(52) U.S. Cl. ........................................ 180/190; 180/9.44
(58) Field of Classification Search .................. 180/9.1, 180/9.25, 9.26, 9.44, 9.46, 9.5, 9.52, 9.54, 180/9.58, 190, 191, 192, 193; 305/127, 135
See application file for complete search history.

(56) References Cited

U.S. PATENT DOCUMENTS

| | | | | |
|---|---|---|---|---|
| 3,568,786 | A * | 3/1971 | Harsch | 180/190 |
| 5,673,766 | A | 10/1997 | Alava | |
| 7,753,155 | B2 * | 7/2010 | Snyder et al. | 180/192 |
| 2003/0209372 | A1 * | 11/2003 | Campbell et al. | 180/9.44 |
| 2007/0246268 | A1 | 10/2007 | Snyder et al. | |

* cited by examiner

*Primary Examiner* — Paul N Dickson
*Assistant Examiner* — Marc Scharich
(74) *Attorney, Agent, or Firm* — Osler, Hoskin & Harcourt LLP

(57) ABSTRACT

A central endless drive track is disposed below the seat of a snowmobile. At least two left wheels are operatively connected to a left track frame disposed forwardly of the seat. A left track engages the left wheels. A left brake is connected to the left track frame and selectively engages one of a first left wheel and the left track to brake the left track. At least two right wheels are operatively connected to a right track frame disposed forwardly of the seat. A right track is disposed around the right wheels. A right brake is connected to the right track frame and selectively engages one of a first right wheel and the right track to brake the right track. A brake lever causes the left and right brakes to brake the left and right tracks respectively.

13 Claims, 11 Drawing Sheets ically provides additional braking.

SNOWMOBILE HAVING FRONT TRACKS WITH BRAKES

CROSS-REFERENCE

The present application claims priority to U.S. Provisional Application No. 61/118,496 filed on Nov. 28, 2008, the entirety of which is incorporated herein by reference.

FIELD OF THE INVENTION

The present invention relates to snowmobiles having front tracks with brakes.

BACKGROUND OF THE INVENTION

A conventional snowmobile is propelled by a rear track that is driven by an engine disposed on the snowmobile. One or two front skis are used to steer the snowmobile. The skis are designed to have a smooth gliding surface in contact with the snow, to provide flotation on the snow and reduce friction while the snowmobile is moving.

When a rider attempts to brake the snowmobile, a braking force is applied to some part of the power transmission between the engine and the rear track, usually to one of the rotating shafts. This braking force causes the rotation of the rear track to slow or stop, which in turn creates drag between the rear track and the snow, reducing the speed of the snowmobile.

However, during braking, a portion of the weight of the snowmobile is transferred from the rear track to the front skis. As a result, the rear track generates less friction, and slowing the rear track is less effective in reducing the speed of the snowmobile. In addition, the front skis do not assist in braking, despite bearing an increased proportion of the weight of the snowmobile, because they are designed to float above the snow and generate as little friction with the snow as possible. As such, while conventional braking systems are sufficient for most snowmobiles, it may be desirable in some snowmobiles to provide additional braking.

Therefore, there is a need for a snowmobile having a braking system providing braking in addition to the braking provided by the rear track.

SUMMARY OF THE INVENTION

It is an object of the present invention to ameliorate at least some of the inconveniences present in the prior art.

It is also an object of the present invention to provide a snowmobile having front endless tracks provided with brakes.

In one aspect, the invention provides a snowmobile comprising a main frame having a longitudinal centerline. A seat is operatively connected to the main frame. A central endless drive track is disposed along the longitudinal centerline below the seat and operatively connected to the main frame. A main motor is disposed on the main frame and operatively connected to the central endless drive track to drive the central endless drive track. A left track frame is disposed forwardly of the seat and to the left of the longitudinal centerline. The left track frame is operatively connected to the main frame. At least two left wheels are operatively connected to the left track frame. The at least two left wheels include a first left wheel. A left endless track engages the at least two left wheels. A left brake is connected to the left track frame and selectively engages one of the first left wheel and the left endless track to brake the left endless track. A right track frame is disposed forwardly of the seat and to the right of the longitudinal centerline. The right track frame is operatively connected to the main frame. A least two right wheels are operatively connected to the right track frame. The at least two right wheels include a first right wheel. A right endless track engages the at least two right wheels. A right brake is connected to the right track frame and selectively engages one of the first right wheel and the right endless track to brake the right endless track. A handlebar is operatively connected to the left and right track frames to steer the left and right endless drive tracks. A brake lever is disposed on the handlebar and operatively connected to the left and right brakes to cause the left and right brakes to brake the left and right endless tracks respectively.

In a further aspect, the central endless drive track has a rounded lateral profile.

In a further aspect, the left and right endless tracks each have a rounded lateral profile.

In a further aspect, the central endless drive track, and left and right endless tracks each have a rounded lateral profile.

In a further aspect, the at least two left wheels and the at least two right wheels are idler wheels.

In a further aspect, at least one of the at least two left wheels is a left driving wheel. At least one of the at least two right wheels is a right driving wheel. A left motor is operatively connected to the left driving wheel for driving the left driving wheel. A right motor is operatively connected to the right driving wheel for driving the right driving wheel.

In a further aspect, the left and right motors are one of electric motors and hydraulic motors.

In a further aspect, the left brake selectively engages the left driving wheel. The right brake selectively engages the right driving wheel.

In a further aspect, the left motor is disposed to the right of the left driving wheel and the left brake is disposed to the left of the left driving wheel. The right motor is disposed to the left of the right driving wheel and the right brake is disposed to the right of the right driving wheel.

In a further aspect, the left brake selectively engages one of the at least two left wheels. The right brake selectively engages one of the at least two right wheels.

In a further aspect, the left brake selectively engages an inner side of the left endless drive track. The right brake selectively engages an inner side of the right endless drive track.

In a further aspect, a left swing arm operatively connects the left track frame to the main frame. A right swing arm operatively connects the right track frame to the main frame.

In a further aspect, the left track frame is pivotally connected to the left swing arm about a generally vertical left steering axis. The right track frame is pivotally connected to the right swing arm about a generally vertical right steering axis.

For purposes of this application, directional terms such as "forwardly", "rearwardly", "right" and "left" are defined with respect to a forward direction of travel of the snowmobile, and should be understood as they would be understood by a rider sitting on the snowmobile in a normal riding position.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Figure 1:
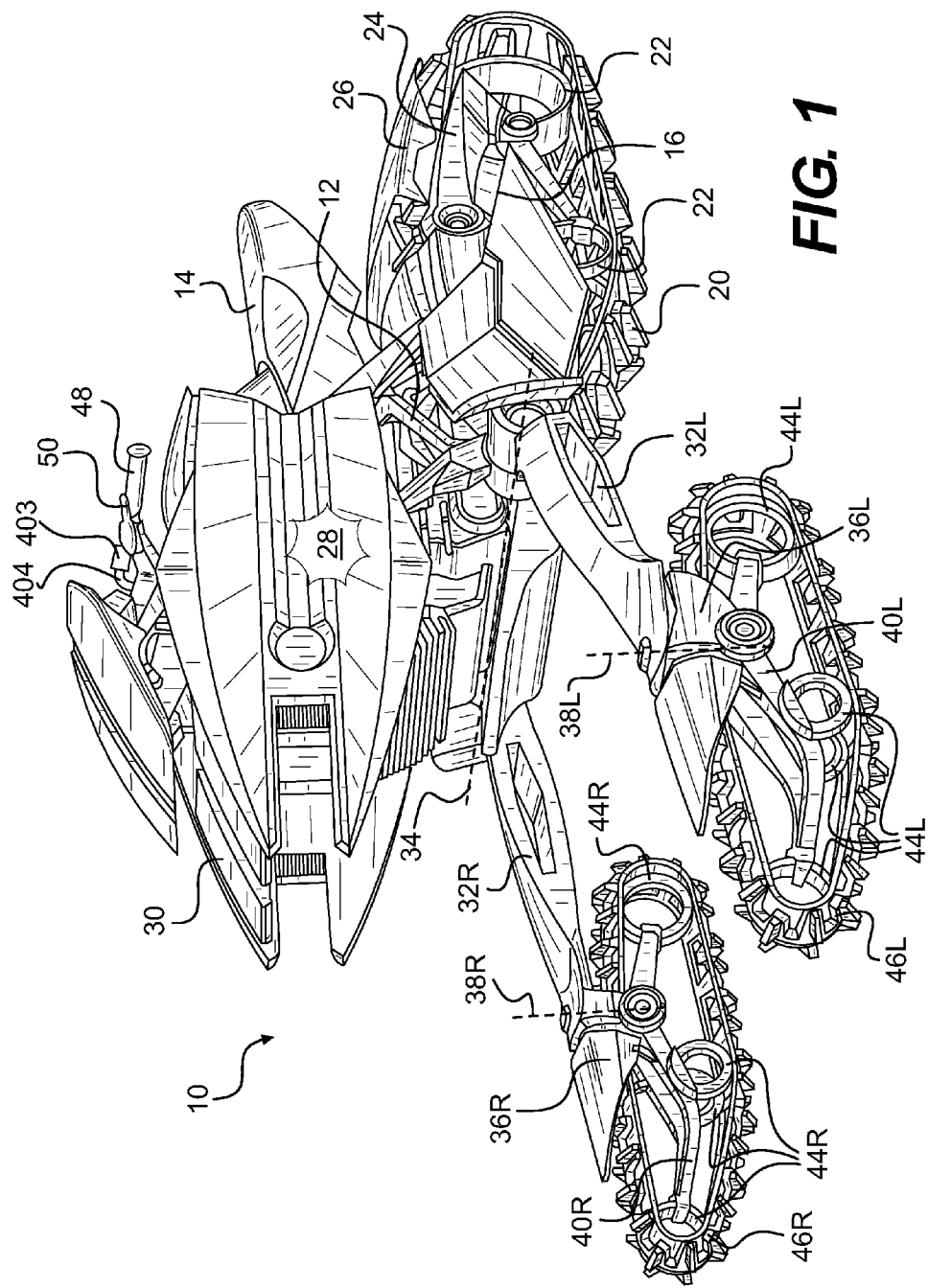
FIG. 1 is a perspective view, taken from a front, left side, of a snowmobile according to the present invention.
Figure 2:
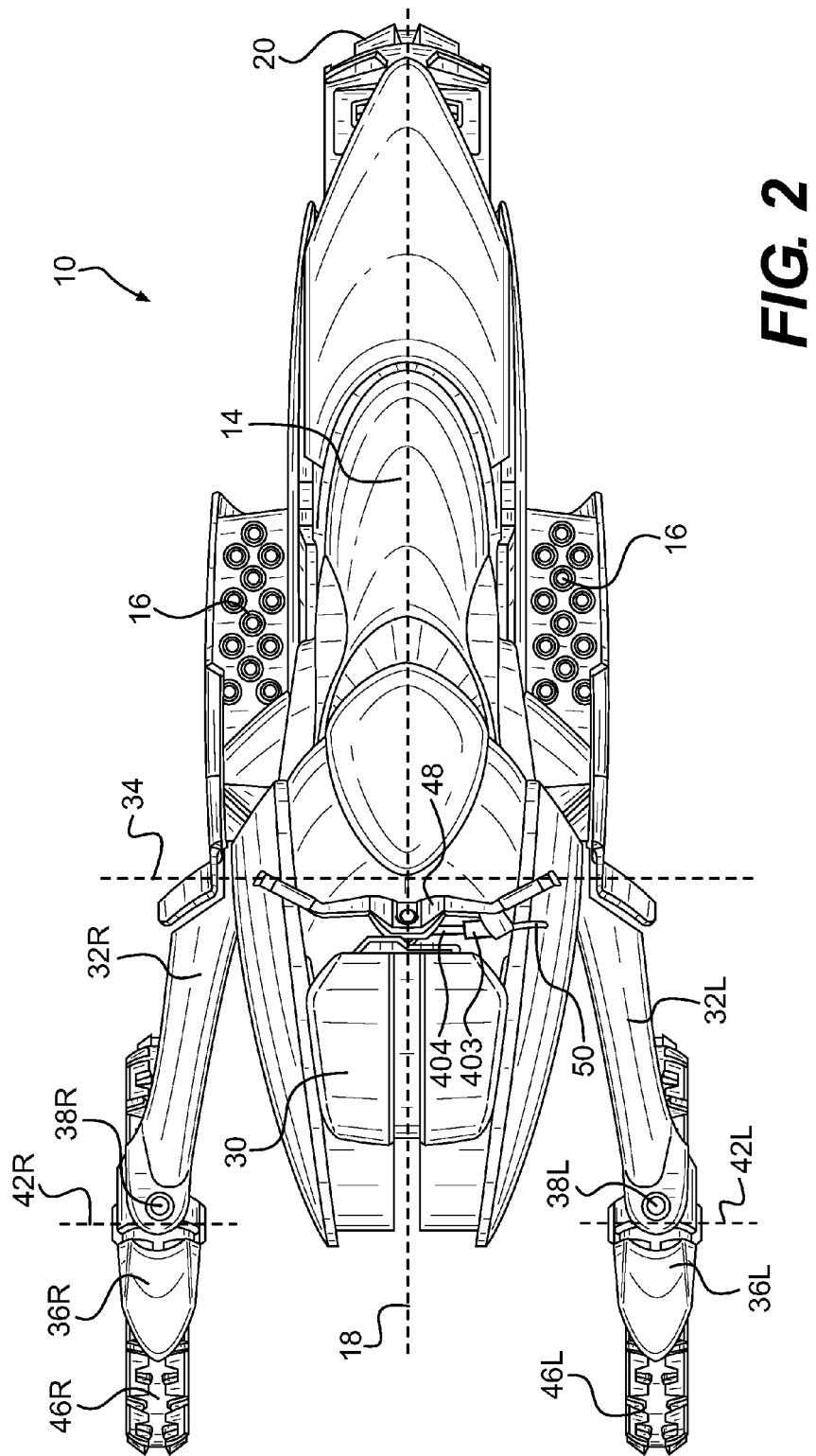
FIG. 2 is a top plan view of the snowmobile of FIG. 1.
Figure 3:
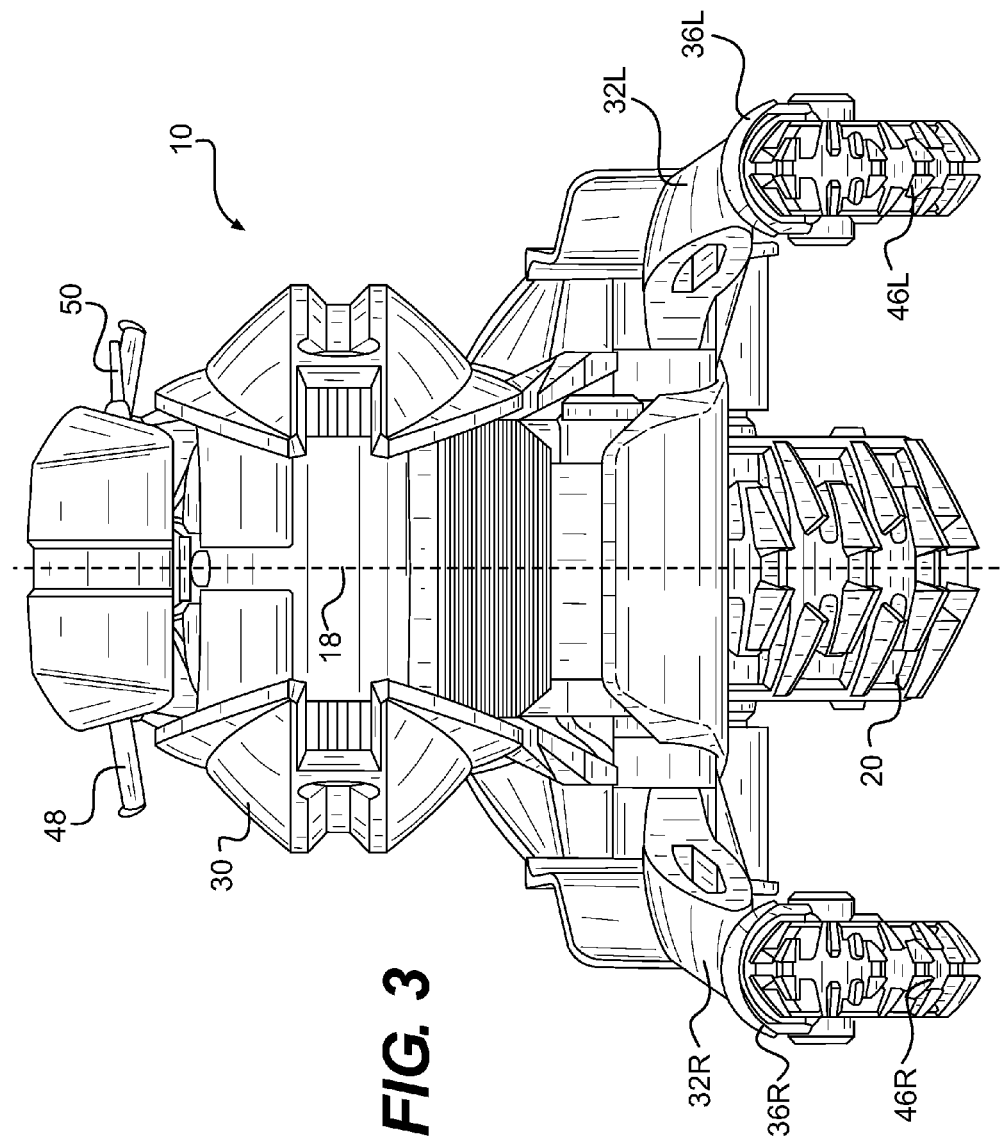
FIG. 3 is a front elevation view of the snowmobile of FIG. 1.

Referring to FIGS. 1-3, a snowmobile 10 will be described. The snowmobile 10 has a main frame 12 supporting a seat 14 for a rider. Footrests 16 are provided on left and right sides of the longitudinal centerline 18 of the snowmobile 10 for supporting the feet of the rider. A central endless drive track 20 is disposed toward the rear of the snowmobile 10, along the longitudinal centerline 18 and generally below the seat 14. Wheels 22 are disposed inside the track 20. The wheels 22 are connected to the main frame 12 via a suspension assembly 24. A guard 26 disposed above the track 20 is connected to the suspension assembly 24. The track 20 has a rounded lateral profile (best seen in FIG. 3). A motor 28 (shown schematically), preferably an internal combustion engine, is supported on the frame 12 and operatively connected to the track 20 via a transmission (not shown) to drive the track 20. A cowling 30, made of multiple parts, encloses the motor 28, thereby protecting the motor 28 and also making the snowmobile 10 more aesthetically pleasing.

A front suspension system consists of left and right swing arms 32L, 32R pivotably connected to the frame 12 such that they pivot independently about a front suspension axis 34. A torsional spring (not shown) and a torsional damper (not shown) operatively connected between each swing arm 32L, 32R and the frame 12. It is contemplated that the front suspension system may alternatively have a linear spring and a linear damper. Left and right track holders 36L, 36R are pivotally connected to the front ends of the left and right swing arms 32L, 32R, respectively, about generally vertical steering axes 38L, 38R. Left and right track frames 40L, 40R are pivotally connected to the left and right track holders 36L, 36R, respectively, about generally horizontal transverse axes 42L, 42R. Left and right wheels 44L, 44R are mounted to their respective track frames 40L, 40R. The wheels 44L, 44R are shown as hubless wheels supported by bearings (not shown), however it is contemplated that conventional wheels may alternatively be used. It is further contemplated that two wheels, or more than three wheels, may be provided on each track frame 40L, 40R, and that one or more of the wheels 44L, 44R may be driving wheels instead of idler wheels. Left and right endless tracks 46L, 46R are disposed around their respective wheels 44L, 44R. The wheels 44L, 44R support the respective tracks 46L, 46R and maintain the desired shape and tension of the tracks 46L, 46R. As can be seen, the endless tracks 46L, 46R are disposed forwardly of and to either sides of the seat 14. The left and right endless tracks 46L, 46R each have a rounded lateral profile (best seen in FIG. 3). The pivotal connections of the track frames 40L, 40R to the track holders 36L, 36R about axes 42L, 42R allow the tracks 46L, 46R to more effectively follow the ground when the snowmobile 10 is in motion. The left and right track holders 36L, 36R are operatively connected to a handlebar 48 disposed generally forwardly of the seat 14, such that the rider can rotate the handlebar 48 to pivot the left and right endless tracks 46L, 46R about the steering axes 38L, 38R to steer the snowmobile 10. A brake lever 50 is disposed on the handlebar 48 for braking the rear track 20 of the snowmobile 10 in a conventional manner, as well as for braking the front tracks 46L, 46R in a manner that will be discussed below in further detail. It is contemplated that two brake levers 50 may be provided, in which case one brake lever 50 would cause braking of the rear track 20 and the other brake lever 50 would cause braking of the front tracks 46L, 46R. It is further contemplated that the rear track 20 of the snowmobile 10 may not be provided with a brake, in which case the brake lever 50 would be used only to brake the front tracks 46L, 46R as the sole method of braking the snowmobile 10.

The braking of the left front track 46L will now be described according to a number of embodiments. In all of these embodiments, it should be understood that the right front track 46R and the right front track frame 40R are essentially mirror images of the left front track 46L and the left front track frame 40L, and the braking of the right front track 46R functions in a similar manner, and as such they will not be separately described.

Figure 4:
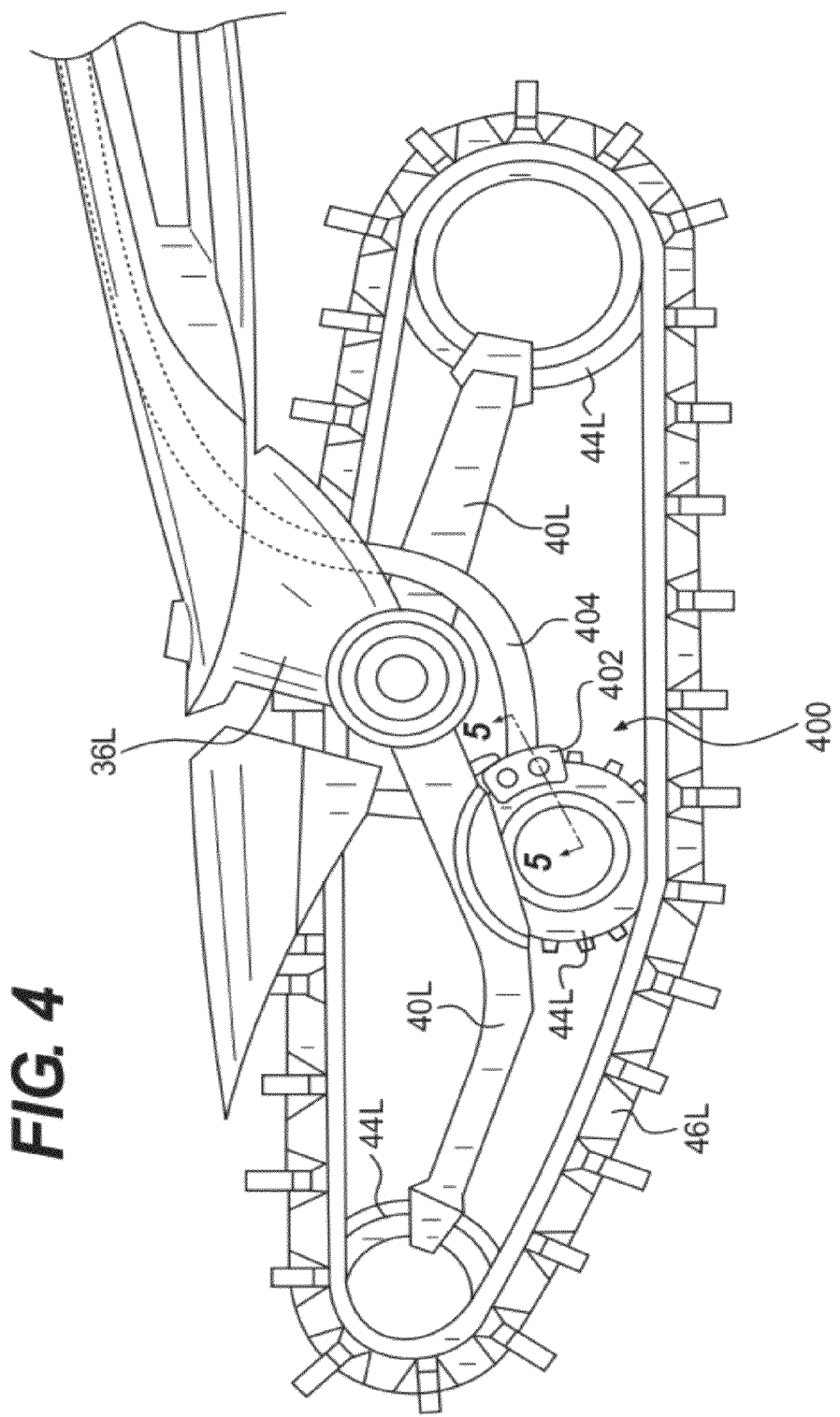
FIG. 4 is a left side elevation view of a left front track of the snowmobile of FIG. 1 according to a first embodiment.
Figure 5:
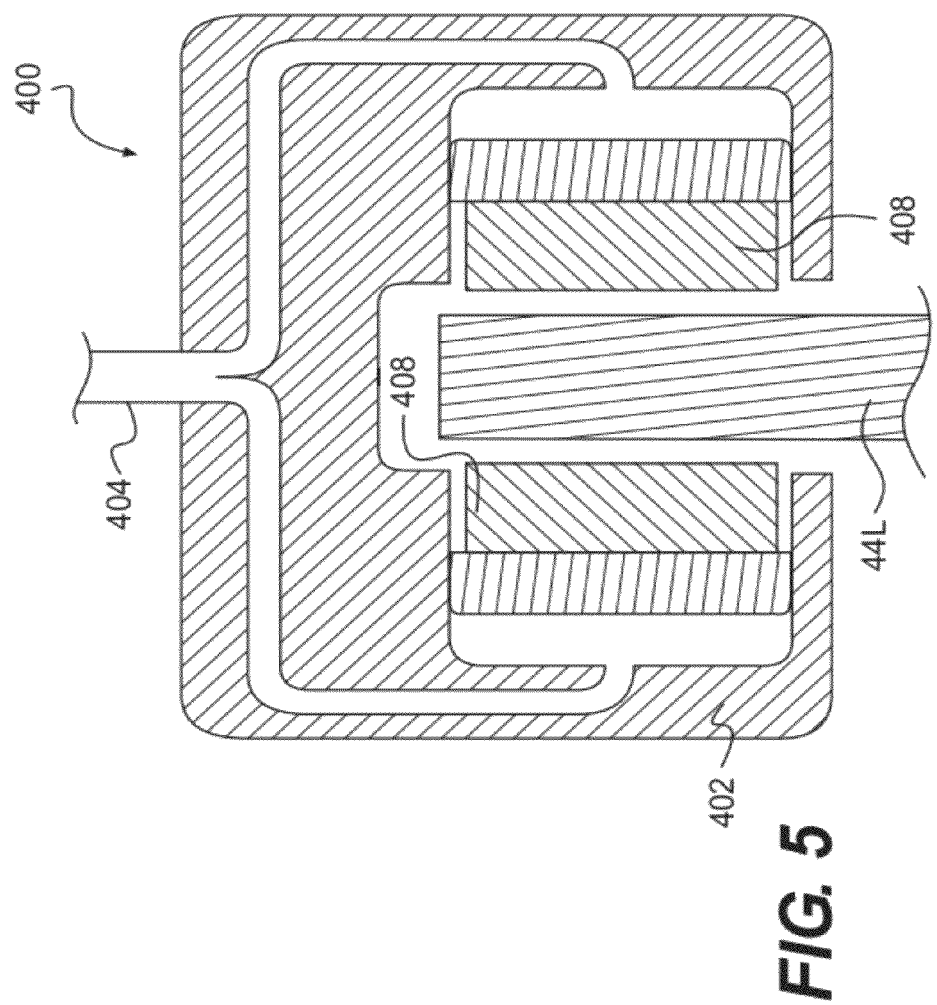
FIG. 5 is a schematic cross-sectional view of the left front track of FIG. 4, taken along the line 5-5 in FIG. 4.

Referring to FIGS. 4 and 5, the braking of the left front track 46L will be described according to a first embodiment. A brake assembly 400 includes a brake caliper 402 mounted to the track frame 40L. The caliper 402 receives a portion of the outer middle wheel 44L therein. A similar caliper (not shown) is mounted on the inner middle wheel 44L. The brake caliper 402 is fluidly connected to a master cylinder 403 mounted on the brake lever 50 via the hydraulic line 404. The master cylinder 403 is operatively connected to the brake lever 50, such that when the rider actuates the brake lever 50, the master cylinder 403 causes the caliper 402 to press a pair of brake pads 408 against the middle wheel 44L, reducing the rotational speed of the middle wheel 44L. The engagement between the middle wheel 44L and the track 46L causes a reduction of the rotational speed of the track 46L. In this manner, the brake assembly 400 supplements the braking force of the rear track 20 to slow the forward motion of the snowmobile 10. It is further contemplated that the brake assembly 400 may additionally or alternatively be applied to the front or rear wheels 44L. It is further contemplated that the brake lever 50 could alternatively be connected to the brake assembly 400 via a mechanical linkage such as a cable, in which case the master cylinder 403 could be omitted.

Figure 6:
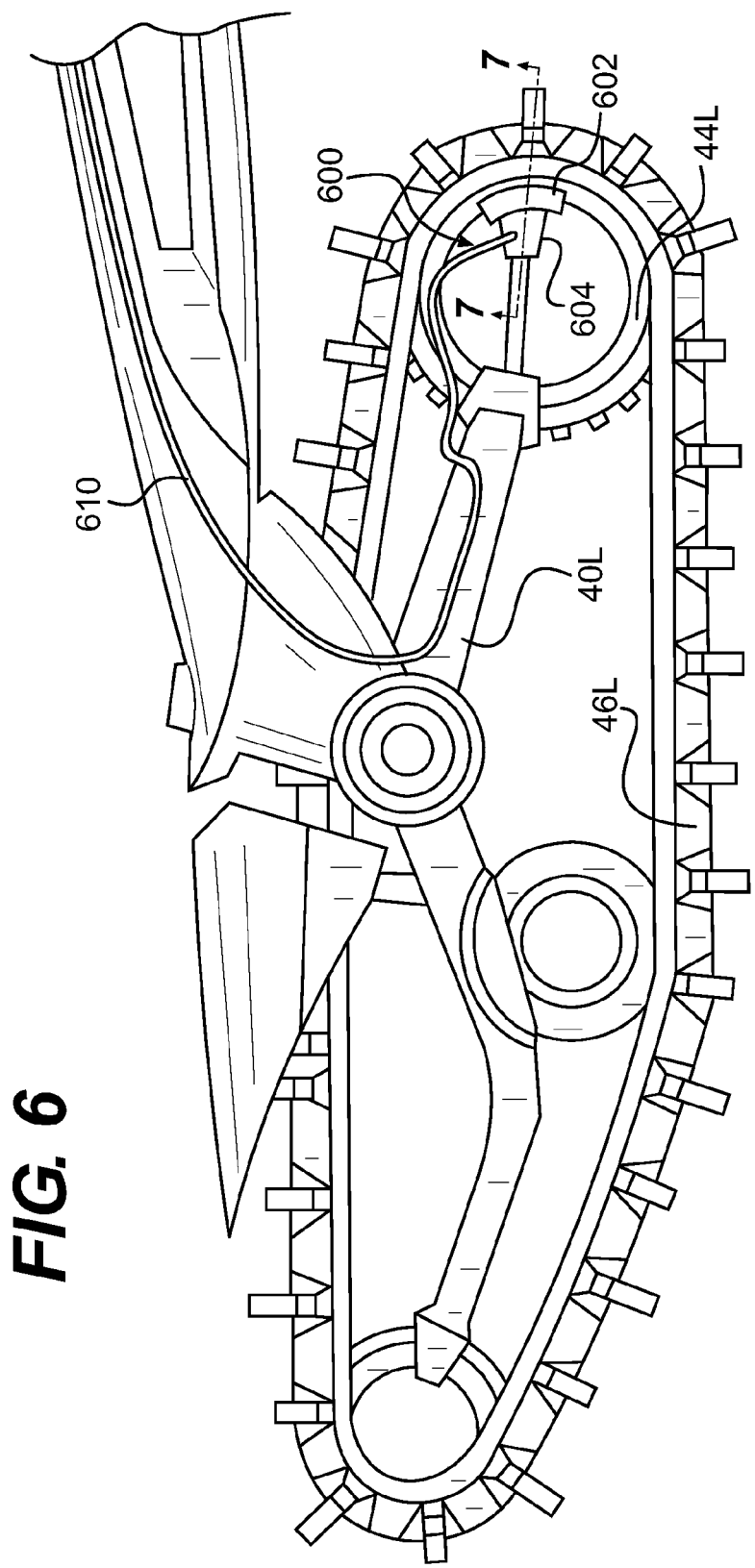
FIG. 6 is a left side elevation view of a left front track of the snowmobile of FIG. 1 according to a second embodiment.
Figure 7:
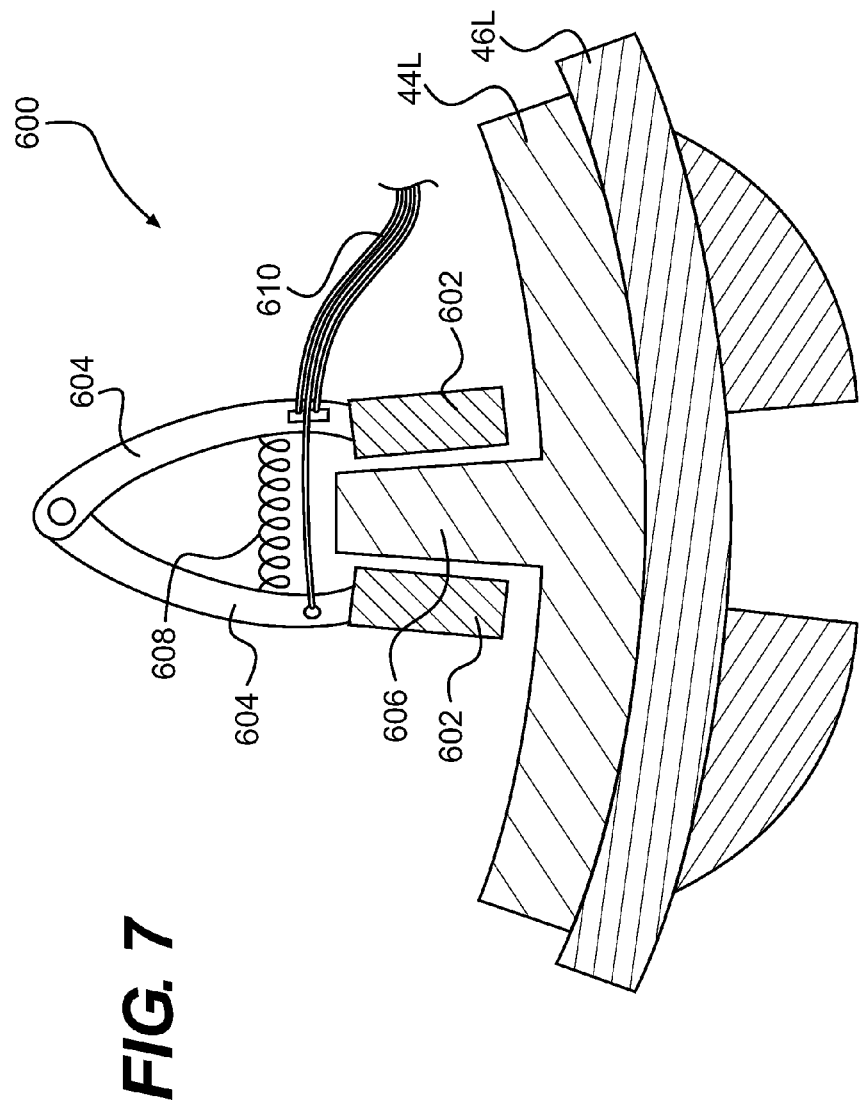
FIG. 7 is a schematic cross-sectional view of the left front track of FIG. 6, taken along the line 7-7 in FIG. 6.

Referring to FIGS. 6 and 7, the braking of the left front track 46L will be described according to a second embodiment. A brake assembly 600 includes a pair of brake pads 602 mounted to the frame 40L inside the rear wheel 44L via the support arms 604. An inward projection of the rear wheel 44L acts as a brake disk 606 that is received between the brake pads 602. A spring 608 biases the brake pads 602 away from the disk 606. An actuator cable 610 is operatively connected to the brake lever 50, such that when the rider actuates the brake lever 50, in addition to a braking force being applied to the rear track 20, the cable 610 urges the brake pads 602 toward the disk 606 against the biasing force of the spring 608. The friction between the brake pads 602 and the disk 606 reduces the rotational speed of the rear wheel 44L. The engagement between the wheel 44L and the track 46L causes a reduction of the rotational speed of the track 46L. In this manner, the brake assembly 600 supplements the braking force of the rear track 20 to slow the forward motion of the snowmobile 10. It is contemplated that the brake assembly 600 may additionally or alternatively be applied to the front or middle wheels 44L.

Figure 8:
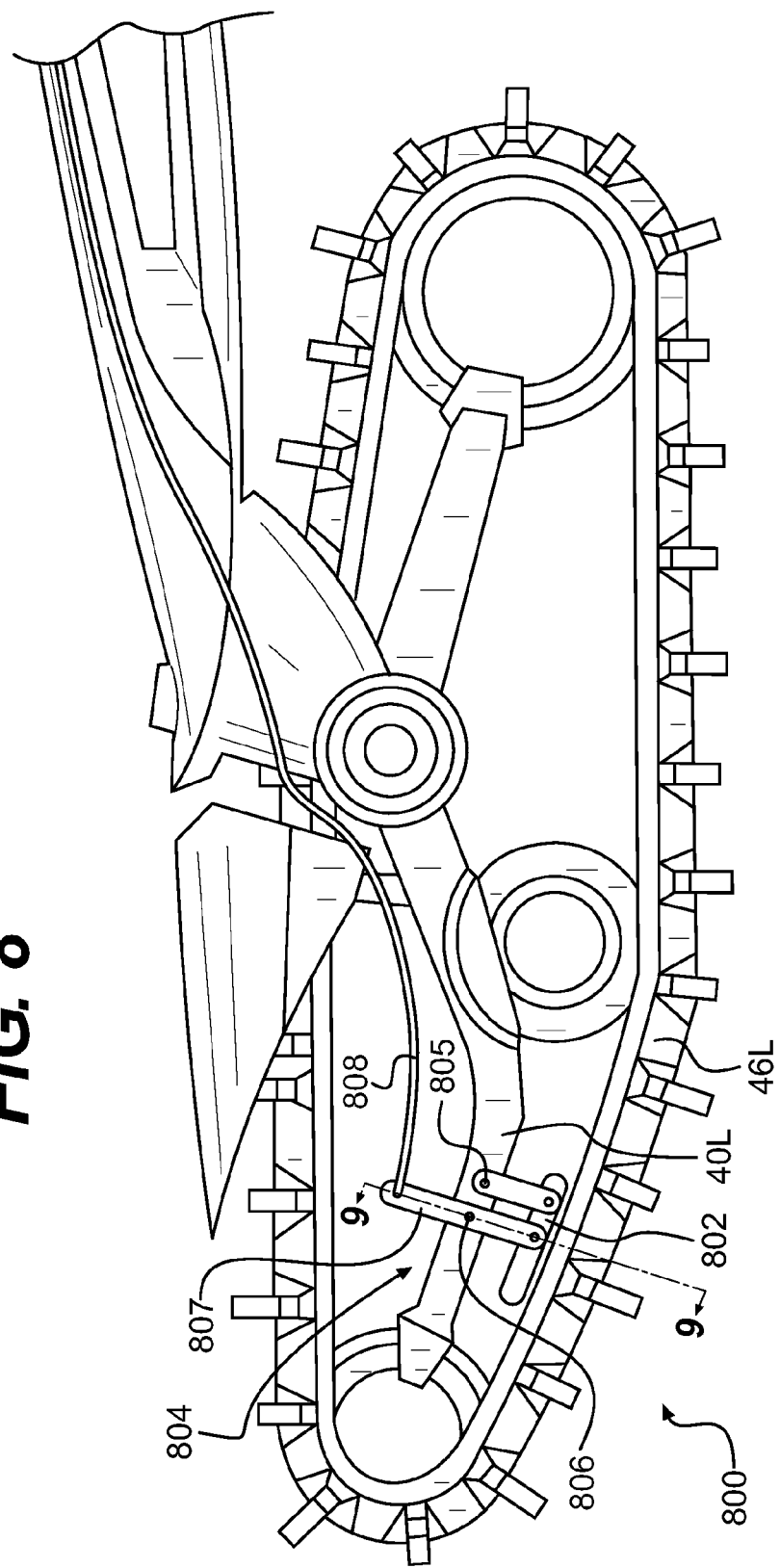
FIG. 8 is a left side elevation view of a left front track of the snowmobile of FIG. 1 according to a third embodiment.
Figure 9:
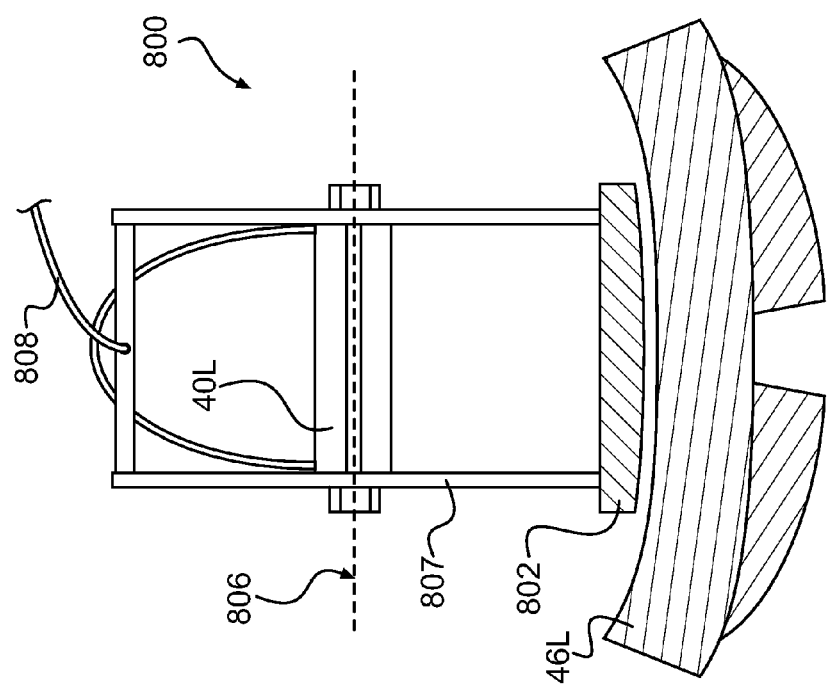
FIG. 9 is a schematic cross-sectional view of the left front track of FIG. 8, taken along the line 9-9 in FIG. 8.

Referring to FIGS. 8 and 9, the braking of the left front track 46L will be described according to a third embodiment. A brake assembly 800 includes a brake pad 802 supported on a linkage 804 that is pivotably mounted to the frame 40L about pivot axes 805, 806. One arm 807 of the linkage is actuated by a cable 808 that is operatively connected to the brake lever 50, such that when the rider actuates the brake lever 50, the linkage 804 urges the brake pad 802 against the inner side of the track 46L. The engagement between the brake pad 802 and the track 46L reduces the rotational speed of the track 46L. In this manner, the brake assembly 800 supplements the braking force of the rear track 20 to slow the forward motion of the snowmobile 10.

Figure 10:
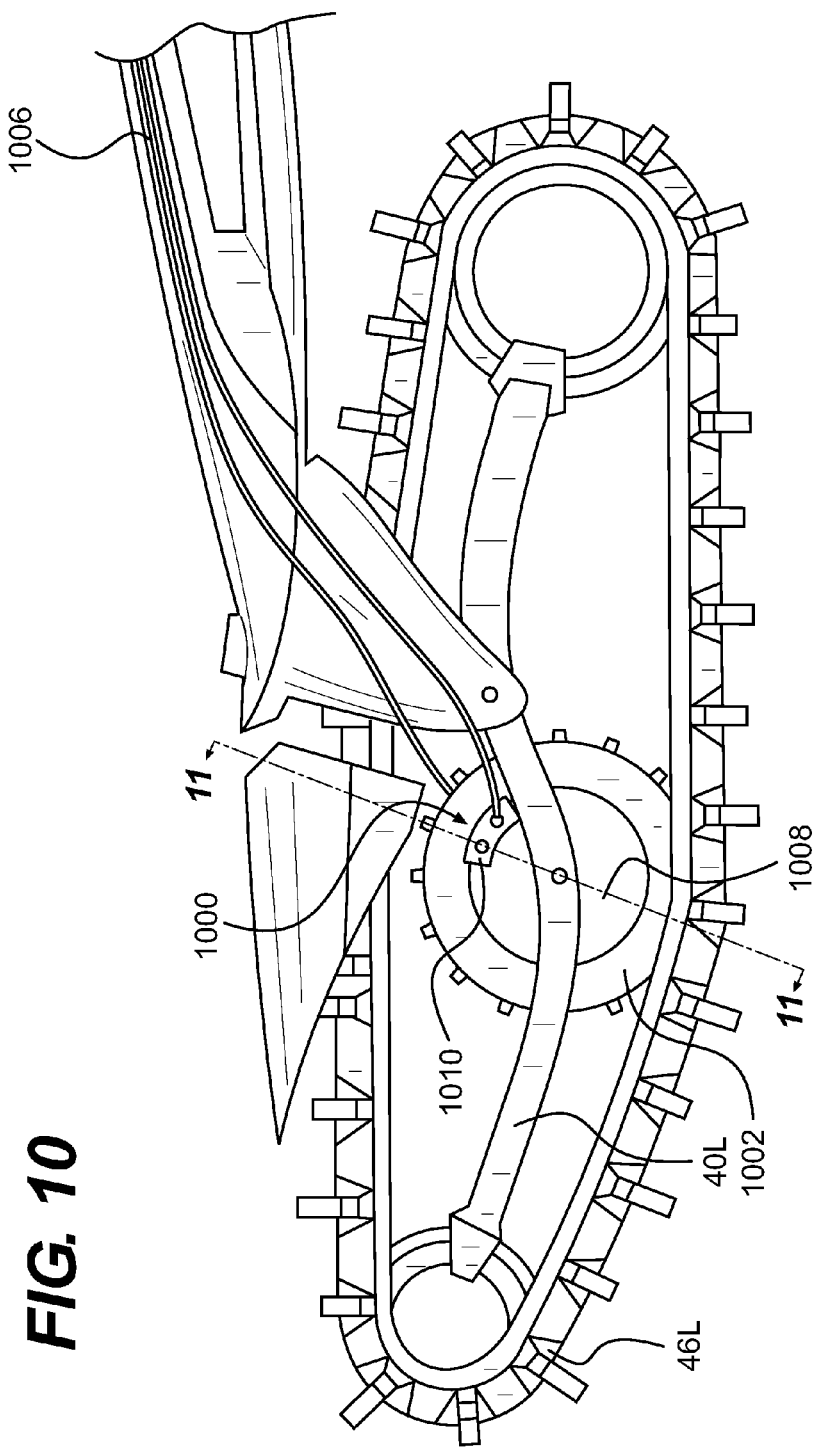
FIG. 10 is a left side elevation view of a left front track of the snowmobile of FIG. 1 according to a fourth embodiment.
Figure 11:
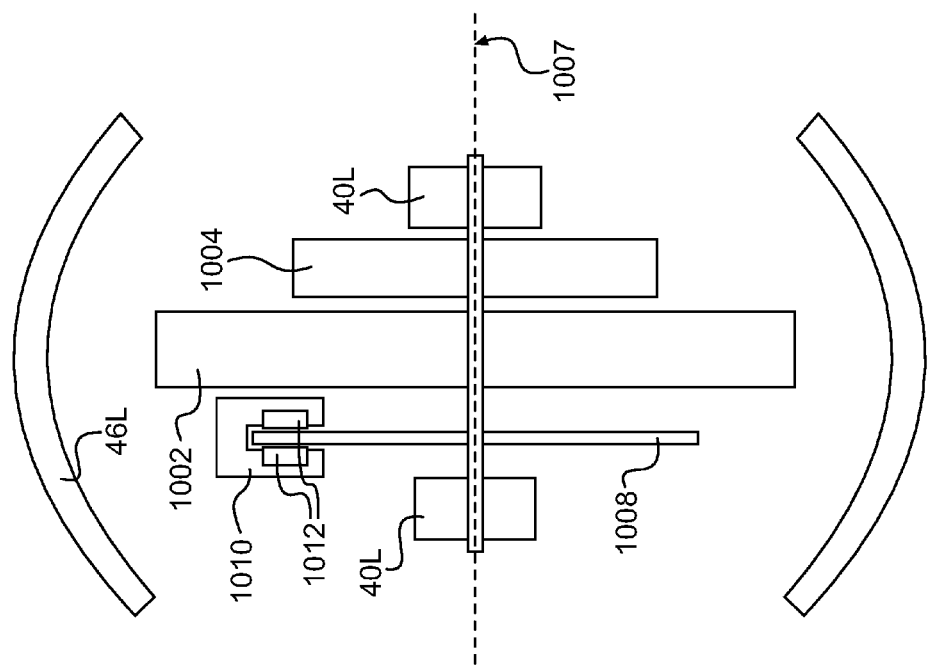
FIG. 11 is a schematic cross-sectional view of the left front track of FIG. 10, taken along the line 11-11 in FIG. 10.

Referring to FIGS. 10 and 11, the braking of the left front track 46L will be described according to a fourth embodiment. In this embodiment, the middle wheels 44L are replaced by a single driving wheel 1002 in engagement with the track 46L and coupled to a motor 1004 (FIG. 11) in the form of an electric motor or a hydraulic motor. The motor 1004 is powered by a suitable power source 1006 (shown schematically) of the snowmobile 10. If the motor 1004 is an electric motor, the power source 1006 is electrical system of the snowmobile 10. If the motor 1004 is a hydraulic motor, the power source 1006 is a hydraulic pump and valve assembly of the snowmobile 10. The motor 1004 drives the wheel 1002 to rotate about the axis 1007, thereby driving the track 46L to assist the rear track 20 in propelling the snowmobile 10. A brake assembly 1000 includes a brake disk 1008 coupled to the driving wheel 1002 such that the brake disk rotates about the axis 1007. A brake caliper 1010 (FIG. 10), similar to the caliper 402 of FIG. 4, is operatively connected to the brake lever 50 and causes brake pads 1012 to selectively engage the brake disk 1008 in substantially the same manner as the caliper 402 to brake the track 46L. In this manner, the brake assembly 1000 supplements the braking force of the rear track 20 to slow the forward motion of the snowmobile 10. It is contemplated that the brake assembly 1000 may additionally or alternatively be applied to the front or rear wheels 44L.

Referring to FIG. 11, showing a cross-section of the left track 46L, the left motor 1004 is disposed to the right of the left driving wheel 1002, and the left brake disk 1008 is disposed to the left of the left driving wheel 1002. It should be understood that the right track 46R is arranged in a mirror image of this arrangement, such that the right motor 1004 is disposed to the left of the right driving wheel 1002, and the right brake disk 1008 is disposed to the right of the right driving wheel 1002. Other arrangements are contemplated, such as disposing each motor 1004 laterally outwardly of the respective wheel 1002 and each brake disk 1008 laterally inwardly of the respective wheel.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A snowmobile comprising:
   a main frame having a longitudinal centerline;
   a seat operatively connected to the main frame;
   a central endless drive track disposed along the longitudinal centerline below the seat and operatively connected to the main frame;
   a main motor disposed on the main frame and operatively connected to the central endless drive track to drive the central endless drive track;
   a left track frame disposed forwardly of the seat and to the left of the longitudinal centerline, the left track frame being operatively connected to the main frame;
   at least two left wheels operatively connected to the left track frame, the at least two left wheels including a first left wheel;
   a left endless track engaging the at least two left wheels;
   a left brake connected to the left track frame and selectively engaging one of the first left wheel and the left endless track to brake the left endless track;
   a right track frame disposed forwardly of the seat and to the right of the longitudinal centerline, the right track frame being operatively connected to the main frame;
   at least two right wheels operatively connected to the right track frame, the at least two right wheels including a first right wheel;
   a right endless track engaging the at least two right wheels;
   a right brake connected to the right track frame and selectively engaging one of the first right wheel and the right endless track to brake the right endless track;
   a handlebar operatively connected to the left and right track frames to steer the left and right endless tracks;
   a brake lever disposed on the handlebar and operatively connected to the left and right brakes to cause the left and right brakes to brake the left and right endless tracks respectively.

2. The snowmobile of claim 1, wherein the central endless drive track has a rounded lateral profile.

3. The snowmobile of claim 1, wherein the left and right endless tracks each have a rounded lateral profile.

4. The snowmobile of claim 1, wherein the central endless drive track, and left and right endless tracks each have a rounded lateral profile.

5. The snowmobile of claim 1, wherein the at least two left wheels and the at least two right wheels are idler wheels.

6. The snowmobile of claim 1, wherein at least one of the at least two left wheels is a left driving wheel, and at least one of the at least two right wheels is a right driving wheel; and
   further comprising:
   a left motor operatively connected to the left driving wheel for driving the left driving wheel; and
   a right motor operatively connected to the right driving wheel for driving the right driving wheel.

7. The snowmobile of claim 6, wherein the left and right motors are one of electric motors and hydraulic motors.

8. The snowmobile of claim 6, wherein the left brake selectively engages the left driving wheel; and
   wherein the right brake selectively engages the right driving wheel.

9. The snowmobile of claim 8, wherein the left motor is disposed to the right of the left driving wheel and the left brake is disposed to the left of the left driving wheel; and
wherein the right motor is disposed to the left of the right driving wheel and the right brake is disposed to the right of the right driving wheel.

10. The snowmobile of claim 1, wherein the left brake selectively engages one of the at least two left wheels; and
wherein the right brake selectively engages one of the at least two right wheels.

11. The snowmobile of claim 1, wherein the left brake selectively engages an inner side of the left endless track; and
wherein the right brake selectively engages an inner side of the right endless track.

12. The snowmobile of claim 1, further comprising:
a left swing arm operatively connecting the left track frame to the main frame; and
a right swing arm operatively connecting the right track frame to the main frame.

13. The snowmobile of claim 12, wherein the left track frame is pivotally connected to the left swing arm about a generally vertical left steering axis; and
wherein the right track frame is pivotally connected to the right swing arm about a generally vertical right steering axis.

* * * * *